US011078979B2

(12) United States Patent
Kiele et al.

(10) Patent No.: US 11,078,979 B2
(45) Date of Patent: Aug. 3, 2021

(54) TORSION-LOADED ROD-SHAPED COMPONENT WITH DIFFERENT FIBRE REINFORCEMENTS FOR TENSILE AND COMPRESSIVE LOADING

(71) Applicants: ThyssenKrupp Federn und Stabilisatoren GmbH, Hagen (DE); ThyssenKrupp AG, Essen (DE)

(72) Inventors: Jörn Kiele, Dresden (DE); Werner Hufenbach, Dresden (DE); Martin Lepper, Dresden (DE); Jens Werner, Coswig (DE)

(73) Assignees: ThyssenKrupp Federn und Stabilisatoren GmbH, Hagen (DE); ThyssenKrupp AG, Essen (DE)

( * ) Notice: Subject to any disclaimer, the term of this patent is extended or adjusted under 35 U.S.C. 154(b) by 249 days.

(21) Appl. No.: 15/317,080

(22) PCT Filed: Apr. 14, 2015

(86) PCT No.: PCT/EP2015/058031
§ 371 (c)(1),
(2) Date: Dec. 7, 2016

(87) PCT Pub. No.: WO2015/188963
PCT Pub. Date: Dec. 17, 2015

(65) Prior Publication Data
US 2017/0122395 A1 May 4, 2017

(30) Foreign Application Priority Data

Jun. 11, 2014 (DE) ..................... 10 2014 211 096.3

(51) Int. Cl.
*F16F 1/366* (2006.01)
*B29C 70/30* (2006.01)
(Continued)

(52) U.S. Cl.
CPC .............. *F16F 1/366* (2013.01); *B29C 70/30* (2013.01); *B29C 70/34* (2013.01); *F16F 1/3665* (2013.01);
(Continued)

(58) Field of Classification Search
CPC .......... F16F 1/021; F16F 1/025; F16F 1/3605; F16F 1/366; B29C 70/34; B29K 2105/06; B29L 2031/7742
(Continued)

(56) References Cited

U.S. PATENT DOCUMENTS 4,380,483 A * 4/1983 Kliger ..................... B29C 53/12
156/169
4,422,627 A * 12/1983 Schmidt ................ B29C 70/083
248/630
(Continued)

FOREIGN PATENT DOCUMENTS

DE 3824933 A1 1/1990
EP 0 145 810 A1 6/1985
(Continued)

OTHER PUBLICATIONS

English translation of FR 2859735, retrieved 2019 (Year: 2019).*
(Continued)

*Primary Examiner* — Robert A. Siconolfi
*Assistant Examiner* — Mahbubur Rashid
(74) *Attorney, Agent, or Firm* — thyssenkrupp North America, LLC (57) ABSTRACT

A torsion spring may be configured as a torsion bar or a helical spring made of a spring wire made of fiber-composite material. The torsion spring may have a plurality of layers of fiber reinforcement that have been saturated with a matrix material, wherein the layers may have fibers that are tension-loaded and fibers that are compression-loaded. The at least
(Continued)

one compression-loaded group may have a lower group stiffness than the tension-loaded group with the highest group stiffness. Methods for designing or making torsion springs made of fiber-composite material are also disclosed.

24 Claims, 6 Drawing Sheets (51) Int. Cl.
*B29C 70/34* (2006.01)
*F16F 1/373* (2006.01)
*B29L 31/00* (2006.01)
*B29K 105/06* (2006.01)

(52) U.S. Cl.
CPC .......... *F16F 1/373* (2013.01); *B29K 2105/06* (2013.01); *B29L 2031/7742* (2013.01); *F16F 2224/0241* (2013.01); *F16F 2226/04* (2013.01); *F16F 2238/024* (2013.01)

(58) Field of Classification Search
USPC ........................................................ 267/155
See application file for complete search history.

(56) References Cited

U.S. PATENT DOCUMENTS

| | | | | |
|---|---|---|---|---|
| 4,468,014 A * | 8/1984 | Strong | ............... | F16F 1/368 188/268 |
| 4,680,923 A * | 7/1987 | Kaempen | ............. | B29C 53/564 52/309.16 |
| 4,817,921 A * | 4/1989 | Stevenson | ............. | B60G 11/52 248/621 |
| 5,549,370 A * | 8/1996 | Folsom | ................. | F16F 1/3665 267/149 |
| 5,558,393 A * | 9/1996 | Hawkins | ................ | F16F 1/328 267/148 |
| 5,580,626 A * | 12/1996 | Quigley | ............... | B29C 53/607 428/36.2 |
| 5,603,490 A | 2/1997 | Folsom | | |
| 5,678,809 A * | 10/1997 | Nakagawa | ............ | C04B 35/806 267/148 |
| 5,685,525 A * | 11/1997 | Oguri | .................... | B29C 53/083 267/148 |
| 6,068,250 A * | 5/2000 | Hawkins | ................ | F16F 1/328 267/148 |
| 6,454,251 B1 * | 9/2002 | Fish | ........................ | B29C 53/12 156/149 |
| 6,612,556 B2 * | 9/2003 | Petrina | ................. | F16F 1/3665 267/168 |
| 7,044,458 B2 * | 5/2006 | Daily | ................... | B60G 21/055 267/149 |
| 8,505,798 B2 * | 8/2013 | Simonelli | ............... | B25F 5/006 227/132 |
| 8,857,801 B2 * | 10/2014 | Yoshioka | .............. | B29C 70/085 267/149 |
| 9,212,714 B2 * | 12/2015 | Shigematsu | ........... | F16F 1/368 |
| 2002/0190451 A1 * | 12/2002 | Sancaktar | ............. | B29C 70/542 267/166 |
| 2005/0116400 A1 * | 6/2005 | White | ..................... | A61F 2/442 267/158 |
| 2008/0284069 A1 * | 11/2008 | Aulich | .................... | F16F 1/368 267/7 |
| 2009/0243174 A1 * | 10/2009 | Spencer | .................. | B29C 53/12 267/169 |
| 2010/0332030 A1 * | 12/2010 | Larkin | .................... | G01L 5/226 700/245 |
| 2013/0125740 A1 * | 5/2013 | Kang | ..................... | B29D 23/18 87/23 |
| 2015/0226279 A1 * | 8/2015 | Scholar | ................. | F16F 1/3605 267/155 |

FOREIGN PATENT DOCUMENTS

| | | |
|---|---|---|
| EP | 0 637 700 A2 | 2/1995 |
| FR | 2 859 735 A1 | 3/2005 |
| JP | S52-36250 A | 3/1977 |
| JP | S54149777 A | 11/1979 |
| JP | S5614889 A | 2/1981 |
| JP | S59144837 A | 8/1984 |
| JP | S6117731 A | 1/1986 |
| JP | S63295239 A | 12/1988 |
| JP | H0319140 U | 2/1991 |
| JP | H07-42778 A | 2/1995 |
| JP | H07323492 A | 12/1995 |
| JP | H 09257069 A | 9/1997 |
| JP | 2006-226327 A | 8/2006 |
| JP | 2008517794 A | 5/2008 |
| JP | 2009538181 A | 11/2009 |
| JP | 2011-241845 A | 12/2011 |
| SU | 1762034 A | 9/1992 |
| WO | 2014/014481 A1 | 1/2014 |

OTHER PUBLICATIONS

English translation of JP2011241845A (Year: 2011).*
English translation of International Search Report for International patent application No. PCT/EP2015/058031; dated Jul. 31, 2015.
English language Abstract of DE 3824933 A1 listed above.
English language Abstract of JP 2006-226327 A listed above.
English language Abstract of EP 0 145 810 A1 listed above.
Helmut Schürmann: Konstruieren mit Faser-Kunststoff-Verbunden [Design with fiber-plastics composites], 1st edition, Springer Verlag 2005.
English language Abstract for JP S6117731 A listed above.
English language machine translation for JPS54149777A listed above.

* cited by examiner

TORSION-LOADED ROD-SHAPED COMPONENT WITH DIFFERENT FIBRE REINFORCEMENTS FOR TENSILE AND COMPRESSIVE LOADING

CROSS REFERENCE TO RELATED APPLICATIONS

This application is a U.S. National Stage Entry of International Patent Application Serial Number PCT/EP2015/058031, filed Apr. 14, 2015, which claims priority to German Patent Application No. DE 10 2014 211 096.3 filed Jun. 11, 2014, the entire contents of both of which are incorporated herein by reference.

FIELD

The present disclosure generally relates to torsion springs, including torsion bars and helical springs that are made from fiber-reinforced plastic.

BACKGROUND

Springs are frequently used in the chassis of motor vehicles. They are therefore likewise involved in the attempts to achieve lightweight construction which especially apply to the unsprung masses of these chassis. In this context there have already been many proposals for use of fiber-composite materials (FCM). These relate in particular to torsion springs made of carbon-fiber-reinforced plastics (CRP) and of glass fiber-reinforced plastics (GRP). It is particularly difficult here to achieve low-cost manufacture of these components in a manner that provides the correct loading capability.

The difficulty is further increased in that the respective fibers can transmit only tensile or compressive forces, and that therefore the macroscopic shear loading in the spring wire has to be divided into a tension component and a compression component (with respect to the principal stress axes, +−45° to the longitudinal axis in accordance with Mohr's theory of stress).

Known springs made of FCM are intended to accommodate the tensile and compressive force distribution in the material in the most advantageous manner possible by using windings of the fibers at an angle of +/−45° to the longitudinal axis.

Tension fiber windings exclusively at +45° are also known, the shear stress components here being borne by the matrix material or by compressive stresses in the core.

Suitable springs are designed with the intention of achieving homogeneous loading of all of the spring material used. The intention is therefore that there are no defined points of weakness in the material, but that instead application of uniform maximal stress causes the entire material to reach its loading limit. This maximizes utilization of the material, and thus represents the best achievable level of lightweight construction.

EP 0637700 describes a spring design using carbon fibers wound at an angle of from +−30° to +−60° around the longitudinal axis. A characterizing feature is that the number of tension fibers used differs from the number of compression fibers. In particular, the number of compression fibers is increased in relation to the number of tension fibers. More uniform loading of the fibers is intended here, with resultant improved specific utilization of the material used. Although this gave improved utilization of the material, because the fibers in the direction of tension and of compression are used in different quantitative proportions and, respectively, different layer thicknesses, the dependency of material utilization on spring wire diameter is not eliminated.

U.S. Pat. No. 5,603,490 proposes using fibers in the direction of tension only, and using no compression-loaded fibers. The fibers are to be wound in such a way that they are subject only to tension loading. In the case of a hollow spring this would radically lead to failure caused by shear stresses, and for this reason a pressure-resistant core which accommodates the stresses is required here. However, the long-term hydrostatic stress in the core and the shear stress in the wound fiber shell lead to disadvantageous creep of the plastics matrix (epoxy). This solution cannot therefore be used by way of example for an application in vehicle construction (long-term loading caused by the weight of the vehicle). Although use of only one fiber direction optimizes use of fiber potential in respect of tension loading, long-term loading results in severe creep due to the shear stresses, most of which have to be transmitted through the plastics matrix because of the lack of compressive fiber support.

WO 2014/014481 A1 proposes a fiber structure where the number of the fibers in layers and core is a multiple of a shared base number. Use of a plurality of different materials in a spring (e.g. glass, carbon, or a mixture) is moreover disclosed. It is moreover disclosed that the angles of the individual fibers of the fiber plies in relation to the longitudinal axis can alternate (in particular between a positive and negative angle). The core of the spring can be composed of unidirectional fibers, but there is also disclosure of a solid core or a hollow core. A core made of material with shape memory is also proposed. Although it is mentioned that the spring material can be composed of mixed materials, no relevant practical information is provided, and the procedure for, and effect of, a mixed structure remain unclear. The number of fibers arranged in the layers is to be a whole-number multiple of a shared reference base, but the effect of this likewise remains unclear. This arrangement has the disadvantage that the fibers are present in the layers only in numbers derived from whole-number factors, and there is therefore a lack of optimized appropriate adjustment of layer thicknesses.

The spring designs of the prior art do not achieve an optimized level of lightweight construction, because they do not achieve effective utilization of the material used.

BRIEF DESCRIPTION OF THE FIGURES AND TABLES

Table 1 concerns the Inventive Example 1 of an example design method with a wound textile, wherein layers are arranged in alternation in a form of glassfiber ply (compression-loaded) and carbon-fiber ply (tension-loaded). Table 1 has two parts, and to improve legibility the first four columns containing characterizing information have been repeated in the second part.

Table 2 concerns fiber materials used for Inventive Example 1 along with their associated properties, at least some of which are known from the prior art and have merely been collated here.

Table 3 concerns Inventive Example 2 of an example design method with a wound textile, wherein compression-loaded layers are glassfiber ply or basalt-fiber ply, and tension-loaded layers are carbon-fiber ply. In a fourth ply, Inventive Example 2 features fibers oriented along a longitudinal axis. Table 3 likewise has two parts, and to improve legibility the first four columns containing characterizing information have been repeated in the second part.

Table 4 concerns fiber materials used for Inventive Example 2 along with their associated properties, at least some of which are known from the prior art and have merely been collated here.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to torsion springs, in some examples, in the form of torsion bars or helical springs that are made of fiber-reinforced plastic, that can be produced in a cost-efficient manner, and that have improved elastic energy storage capability, especially in comparison to springs that are composed only of carbon-fiber-reinforced plastic. The present disclosure also generally relates to methods for the design of such springs.

The challenge that arises is producing an arrangement of the fibers within a torsion-loaded spring wire where the loading of the compression- and tension-loaded fibers is maximized in accordance with their loading limit, in order to achieve improved mass-based energy storage density. One example object of the present disclosure is as far as possible to use only a limited number of different fiber materials, and thus to achieve a low-cost design in relation to the use of materials, and to propose methods for the design of this type of spring. The spring wire hi a helical spring takes the form of a wound helix. The spring, specifically the helical spring, has a spring axis around which the spring wire takes the form of a helix: The cross section of the spring wire is preferably a circular annulus, but can also be elliptical or polygonal.

In particular, said object is achieved by achieving the following three sub-objects:

the plies are selected in accordance with economic considerations, and therefore in particular highly loaded carbon fiber plies are used for the tension-loaded fiber plies, tension plies and compression plies are to be loaded uniformly, in order to prevent creep of the matrix material and resultant long-term deformation of the entire spring, shear forces or stresses transmitted by the matrix between the plies are to be minimized.

The scope of the torsion-loaded elongate component comprises only the spring support structure, and not the load-introducing elements, for example appropriately designed regions on the spring plate or of the spring restraint.

The following expressions are moreover used in the definitions below:

Tension direction: preceded by + sign

Compression direction: preceded by − sign

Longitudinal axis: —An axis in the center of the spring wire along the length thereof, also termed spring wire axis.

Fiber angle $\alpha_j$: —The fiber angle is the angle between the fiber orientation and the longitudinal axis.

Ply $L_i$: —A ply can combine a plurality of layers; by way of example, a multiaxial laid scrim/helical winding/braided fabric ply generally comprises 2 layers with different fiber orientation (respectively one + and one − layer; e.g. +−45°). The layers of the ply have usually been connected to one another (e.g. crimped or knitted or stitched or coherently bonded).

In contrast, a UD (unidirectional) laid scrim ply generally comprises only one layer in the orientation of oriented fibers.

However, a plurality of plies can also form a layer; (a plurality of adjacent UD plies with identical angular orientation and identical ply material form a UD layer).

A ply is generally composed of inorganic reinforcement fibers (e.g. basalt fibers, glass fibers), metallic reinforcement fibers (e.g. steel fiber), organic reinforcement fibers (e.g. carbon fibers, aramid fibers), or natural fibers (e.g. hemp fibers).

A ply has an associated ply wall thickness $LW_i$.

A ply can also be a homogeneous plastics ply without reinforcement fibers, being classified as non-load-bearing (for example: exterior termination of the arrangement).

A ply can also be a short- or long-fiber-reinforced plastics ply in which the arrangement has the fibers with no preferential direction, said ply being classified as non-loadbearing.

A ply can also be composed of a metallic material (for example a terminating ply made of sheetmetal).

The ply number i increases from the inside toward the outside.

Layer $S_j$: —In the case of continuous-fiber-/textile-fiber-reinforced layers all of the fibers of a layer $S_j$ have uniform angular orientation $\alpha_j$.

However, there can also be fibers of different material $M_j$ present alongside one another or in a mixture in a layer.

Layers can also be homogeneous plastics plies without reinforcement fibers, plies comprising a short- or long-fiber-reinforced plastic, metallic plies or the like.

The layer number j increases from the inside toward the outside.

The layers with fiber angle in the range from 20° to 70° in tension direction (+) or −20° to −70° in compression direction (−) are termed loadbearing layers (preferably from 30° to 60° in tension direction (+) or from −30° to −60° in compression direction (−)).

A loadbearing layer serves either predominantly to accommodate tensile (+ sign) or compressive (− sign) stresses in fiber direction.

All of the layers with angles outside of the angular range from 20° to 70° in the tension direction (+) or from −20° to −70° in the compression direction (−) are classified as non-loadbearing.

Cross-sectional area $A_{S_j}$: —Each layer has an associated cross-sectional area $A_{S_j}$.

The normal to the cross-sectional area is the longitudinal axis.

The cross-sectional area is calculated by way of example in the case of a circular-annulus cross section by way of the formula for the area contained within the circular annulus.

Layer axis: —Each layer has an axis which runs at the fiber angle $\alpha_j$ in relation to the longitudinal axis and rotates in accordance with the layer profile in a helix along the longitudinal axis.

Layer diameter $D_j$: —Arithmetically averaged diameter derived from internal and external diameter of the corresponding layer.

In the event that, as is the case with crimped layers (e.g. braided fabric), 2 layers are derived, the two layers have the same layer diameter.

Layer stiffness $E_{S_j}$: The layer stiffness $E_{S_j}$ is the individual or combined modulus of all of the fiber components and matrix components of the respective layer (in accordance with the mixture rule in classical laminate theory (e.g. Puck, Tsai, Niederstadt, Geier) transformed to an orientation of +/−45° in relation to the longitudinal axis.

Only absolute values are used.

Formula for calculation of layer stiffness $E_{S_j}$:

$$\frac{1}{E_{S_j}} = \frac{c^2}{E_1}(c^2 - s^2 v_{12}) + \frac{s^2}{E_2}(s^2 - c^2 v_{21}) + \frac{c^2 s^2}{G_{12}}$$

where $c = \cos(|\alpha|-45°)$ and $s = \sin(|\alpha|-45°$ $E_{S_j}$—Layer stiffness, $E_1$—Stiffness longitudinally in relation to the fiber of the material $M_j$, $E_2$—Stiffness perpendicularly to the fiber direction of the material $M_j$, $G_{12}$—Shear modulus of the material $M_j$, $v_{12}$—Major Poisson's ratio of the material $M_j$, $v_{21}$—Minor Poisson's ratio of the material $M_j$.

Group $G_k$: —One or more loadbearing layers in contact with one another in a direction of loading (tension orientation or compression orientation) together respectively form a group $G_k$.

Formation of a group is not dependent on the materials used or on allocation to any particular ply.

Assessment of contact between layers or plies ignores those classified as non-loadbearing; layers that are not physically in contact with one another can therefore also sometimes be considered to be in contact with one another.

The numbering of the groups starts from the inside.

Group axis: —Each group has, in accordance with the tension orientation or compression orientation, a group axis which runs at +45° (tension) or −45° (compression) in relation to the longitudinal axis and which rotates in accordance with the layer profile in a helix along the longitudinal axis.

Group stiffness $E_{G_k}$: —The group stiffness $E_{G_k}$ corresponds to the area-weighted individual or combined modulus, transformed in the direction of the group axis, of all of the fiber components and matrix components of the respective group (in accordance with the mixture rule in classical laminate theory (e.g. Puck, Tsai, Niederstadt, Geier).

Only absolute values are used.

Formula for calculation of group stiffness $E_{G_k}$:

$$E_{G_k} = \frac{\sum_j E_{S_j} A_{S_j}}{\sum_j A_{S_j}}$$

where layers j belong to the group k $E_{G_k}$—Group stiffness of the group k, $E_{S_j}$—Layer stiffness of the layer j, $A_{S_j}$—Cross-sectional area of the layer j.

Group extensional stiffness $F_{G_k}$: —Product of group stiffness and relevant cross-sectional area of the group Formula for calculating group extensional stiffness $F_{G_k}$:

$$F_{G_k} = E_{G_k} \times \sum_j A_{S_j},$$

where layers j belong to the group k $F_{G_k}$—Group extensional stiffness of the group k, $E_{G_k}$—Group stiffness of the group k, $A_{S_j}$—Cross-sectional area of the layer j.

Pair $P_n$: —2 groups in contact with one another respectively form a pair; (a necessary result of formation of the group is that a pair is always composed of 2 groups with +45° and −45° group axis).

Assessment of contact between layers or plies ignores those classified as non-loadbearing; groups that are not physically in contact with one another can therefore also sometimes be considered to be in contact with one another.

Formation of the pairs starts at the innermost group and is continued successively toward the outside.

A group already successfully allocated to a pair cannot form a pair with another group in contact therewith.

Group ratio $GV_n$: —A group ratio as follows is allocated to the groups in a pair: group extensional stiffness of the group with +45° group axis divided by group extensional stiffness of the group with −45° group axis; (the group extensional stiffness values here are not preceded by any sign because the calculation uses only absolute values for group stiffness).

Pair ratio $PV_n$: —A pair ratio as follows is allocated to two pairs in contact with one another: Stiffness of the inner pair divided by stiffness of the pair in contact.

Mixed fiber—Roving or fiber bundle composed of filaments of various material.

The considerations below relating to the design method or the fiber arrangement in the spring wire are based on ideal coincidence of the calculated or defined fiber angles $\alpha_j$ in the manufactured component. Possible angular displacements, respectively in + and − direction from the calculated values, due to forming operations (for example: winding of the stretched spring wire along the spring axis to give a helix), plant-specific manufacture tolerances (for example: variations in the rotational velocity of the winding plant), or displacements due to handling operations (for example: manual transport of intermediate products) in the manufactured component are not relevant for the purposes of the design method proposed, as long as the absolute angular difference is less than 20°, preferably less than 10°, and very particularly preferably less than 5°.

The preferred method for the design of the spring of the invention provides the following:

Pre-design of the spring on the basis of values derived from experience and in accordance with the prior art. The parameters of this spring are used as starting parameters for the optimization of the spring by the method of the invention.

All of the design steps listed below must be carried out iteratively on their own or repeatedly as an entirety, in order to comply with all of the required design criteria in a loop-based process.

Step 1:

In a first step, the structure of the spring wire is designed in a manner that uses a very stiff fiber material, for example carbon fibers, in at least one tension-loaded group. It is therefore possible to identify, from the design process, a tension-loaded group which has the highest group stiffness. It is then necessary to design at least one compression-loaded group in such a way that it has lower group stiffness. The classification "low" is applied to the compression-loaded group if its group stiffness is at most 90%, preferably at most 80%, and particularly at most 60%, that of the tension-loaded group. For at least one compression-loaded group, therefore, the group stiffness has decreased by at least 10%, preferably at least 20%, and particularly preferably by 40%, in relation to the tension-loaded group with the highest group stiffness. The lower group stiffness is preferably achieved by using, for example, glassfiber material. It is preferable that there are a plurality of tension-loaded groups made of carbon fibers with compression-loaded groups of low group stiffness in contact with one another. It is particularly preferable that all of the tension-loaded groups are composed of carbon fibers and that all of the compression-loaded groups have lower group stiffness.

This is achieved by way of example by means of one of, or a combination of two or three of, the following possibilities:

Possibility I: Different fiber material
For this, high-strength fibers (e.g. HTCF) are used in the tension-loaded group, and low-stiffness fibers (e.g. GF) are used in the compression-loaded group.

Possibility II: Different fiber angles
Appropriate fine adjustment of group stiffness can be achieved via the fiber angles in such a way that the compression-loaded group has lower group stiffness.

Possibility III: Mixture of various fibers
Another possibility, if the stiffness changes are too large to be compensated for by the fiber angles, is to use a different material with a mixture of main fiber types to permit achievement of the required lower group stiffness values for the compression-loaded group.

Step 2:

Pairs are then formed, from the inside toward the outside. The problem of creep of matrix material under long-term loading is generally caused by very high shear stress between the groups in the spring. In order to avoid, or greatly to reduce, shear stresses between the groups, the groups of a pair are to have comparable group extensional stiffness values; these can be influenced by way of example via the cross-sectional area, the fiber content by volume, the fiber angle, or the selection of material. The group ratio is calculated from the two group extensional stiffness values of a pair. The group ratio must lie within a prescribed range. The design method provides that the group ratio GV is in the range $0.2<=GV<=5$, preferably $0.5<=GV<=2$, and very particularly preferably $0.75<=GV<=1.33$.

In order to achieve acceptable group ratios it is necessary by way of example to use appropriately adjusted cross-sectional areas to compensate different material stiffness values of different fiber types. For this, a preferred procedure selects the fiber stiffness in accordance with the loading capability of the fibers. By way of example, carbon fibers (HTCF) have low energy storage density under compressive load, and can preferably therefore be used efficiently for tension-loaded layers. Glass fibers have good compressibility, and can therefore also be used successfully for compression-loaded layers. By way of example, a tension-loaded group made of HTCF fibers and a compression-loaded group made of glass fibers, there being just one layer of each, then form a pair. The tension-loaded group (HTCF) then has higher group stiffness than the compression-loaded group (GF). A preferred group ratio can be established by appropriate adjustment of the layer wall thickness and, with this, the cross-sectional area. The product of group stiffness and relevant cross-sectional area provides the group extensional stiffness. In the case of the pair composed of HTCF and glass fibers, the layer wall thicknesses can by way of example be 1 mm for the tension-loaded group and 2.5 mm for the compression-loaded group. It is thus possible, by way of the relevant cross-sectional areas, to achieve similar group extensional stiffness values for the tension-loaded and the compression-loaded group, and the value of the group ratio is within the desired range. There are therefore almost no shear stresses between the groups, and the spring wire therefore has advantageous creep behavior.

Other preferred embodiments provide the use of one or more intermediate or external layers that are very thin and therefore make hardly any contribution to the support behavior of the component, but which by virtue of their fiber orientation by way of example make a contribution to the transverse stiffness of the spring, or are a terminating layer to counter adverse effects of environmental media. However, the invention intends that only at most 25%, preferably 15%, particularly preferably 5%, of the mass of the spring wire (without core) is composed of layers classified as non-loadbearing.

Preference is further given to the use of a spring wire in which the mass of the compression-loaded groups with lower group stiffness makes up a proportion of at least 20%, preferably 50%, and particularly preferably 95%, based on the mass of all of the compression-loaded groups of the spring wire. A very particularly preferred embodiment of the torsion spring of the invention provides that the tension-loaded groups, from the inside to the outside, have the same group stiffness (within the balance of manufacturing tolerances). In an embodiment to which further particular preference is given, the compression-loaded groups also have, or only these have, the same group stiffness from the inside to the outside (within the balance of manufacturing tolerances). It is further preferable that at least one internally situated compression-loaded group has lower group stiffness than a tension-loaded group situated further outward.

Preference is further given to the use of a spring wire in which at least a proportion of 50% of the total mass of the spring wire (without core), preferably 75%, and particularly preferably 95%, of the groups of the spring wire have been successfully allocated to a pair.

Preference is further given to the application of an exterior plastics ply or ply made of matrix material without fiber reinforcement. However, the method of the invention provides that when loading occurs at least 75%, preferably 85%, particularly preferably 95%, of the elastic energy is stored by the fiber-composite material and not by the exterior plastics ply. Another possibility included here is that the exterior plastics ply fractures, but the fiber-reinforced plies and the optionally present core remain undamaged.

It is preferable to use computer assistance for the computational design of the spring of the invention. After design in accordance with the method of the invention, the spring is manufactured by processes of the prior art.

The invention designs the selection of materials for the load-bearing cross section of the spring (ignoring coatings, etc. which are non-loadbearing) in such a way that the compression- and tension-loaded groups are composed of a small number of different fiber materials. It is preferable to use a low-cost material for the compression-loaded groups, an example being glass fiber (GF). In the region of the tension-loaded fibers it is possible to also use carbon fiber (CF) in order to increase mass-specific energy storage density.

It is preferable that the spring wire of the spring of the invention has a circular cross section. However, elliptical or polygonal cross sections are also possible. The spring optionally has a core. This is preferably composed of fiber-composite material in which the fibers run unidirectionally, parallel to the longitudinal axis. Other preferred embodiments provide a hollow core in which a fiber-composite material or an unreinforced plastics shell surrounds an axial cavity. Preference is further given to a core which is composed entirely of plastic, or a core which is formed exclusively by a cavity.

It is further preferable that the pair ratios of adjacent pairs differ only slightly from one another, so that shear stresses occurring between the pairs are also minimized, and therefore the tendency of the spring wire toward creep is minimized. Said pair ratio is calculated from the stiffness values of the groups of the two pairs.

The spring of the invention is preferably used in vehicle construction, in motor vehicles, and in rail vehicles. However, use is possible in any of the application sectors of helical springs or more generally of torsion springs where the environmental conditions do not attack the materials used in the spring to an unacceptable extent.

Inventive Example

In all of the inventive examples, the cross-sectional area is calculated by way of the formula for the cross section of a circular annulus. For each inventive example, the specific factual situation is described by using a sectional depiction of the spring wire, a table to describe the properties of the spring wire, and a table to show the relevant properties of the materials.

Figure 1A:
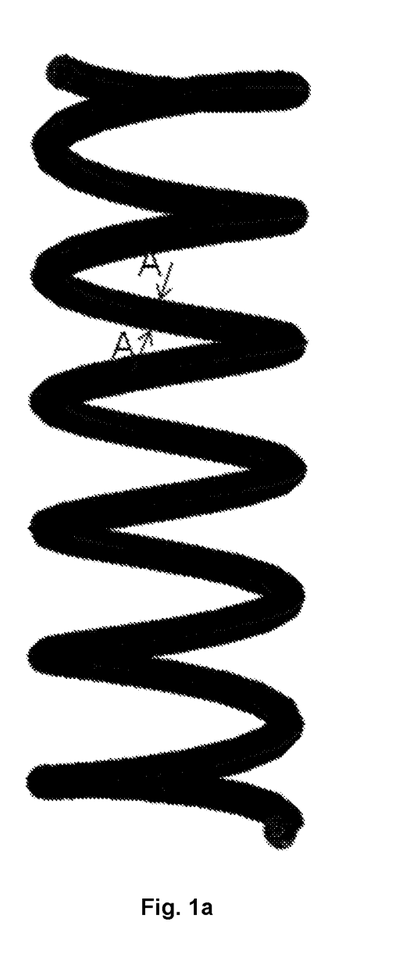
FIG. 1a is a schematic diagram of an example torsion spring in the form of a helical spring with a core.
Figure 1B:
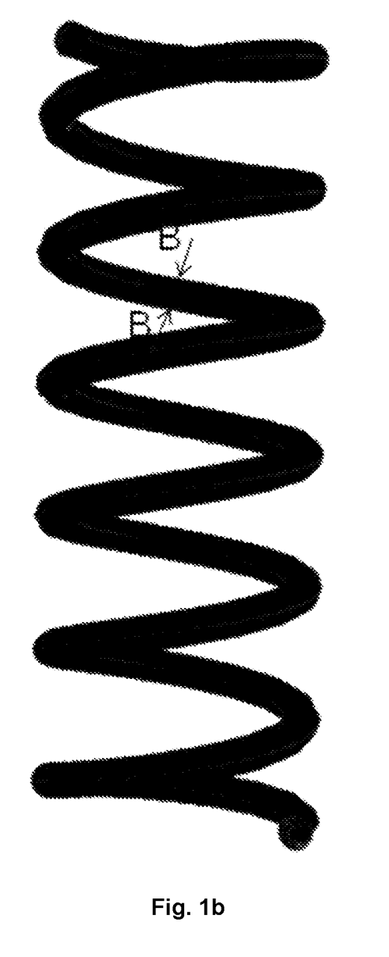
FIG. 1b is a schematic diagram of an example torsion spring in the form of a helical spring without a core.
Figure 2:
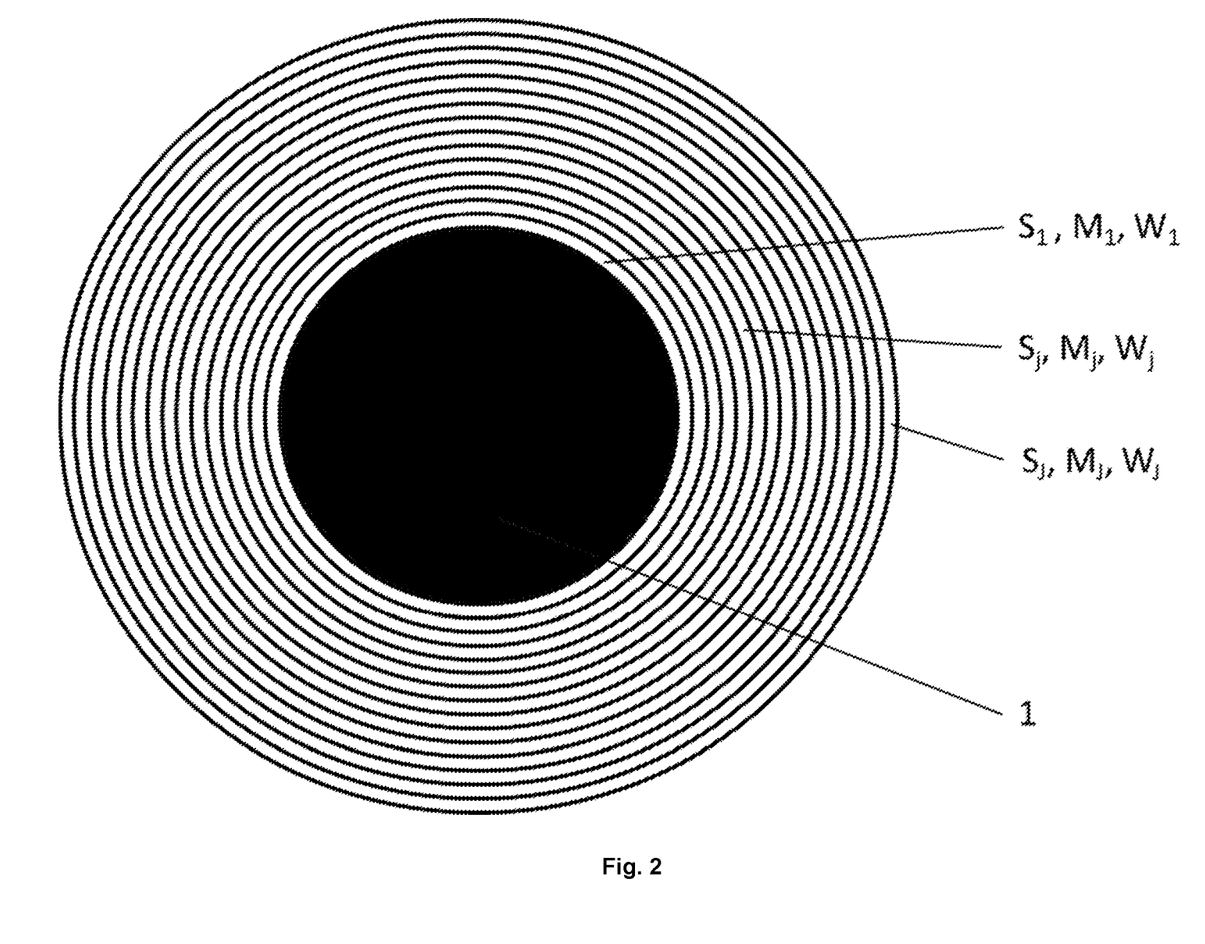
FIG. 2 is a cross sectional view taken across line AA of FIG. 1a of a spring with a solid core and multiple layers with associated layer wall thicknesses and layer materials.
Figure 3:
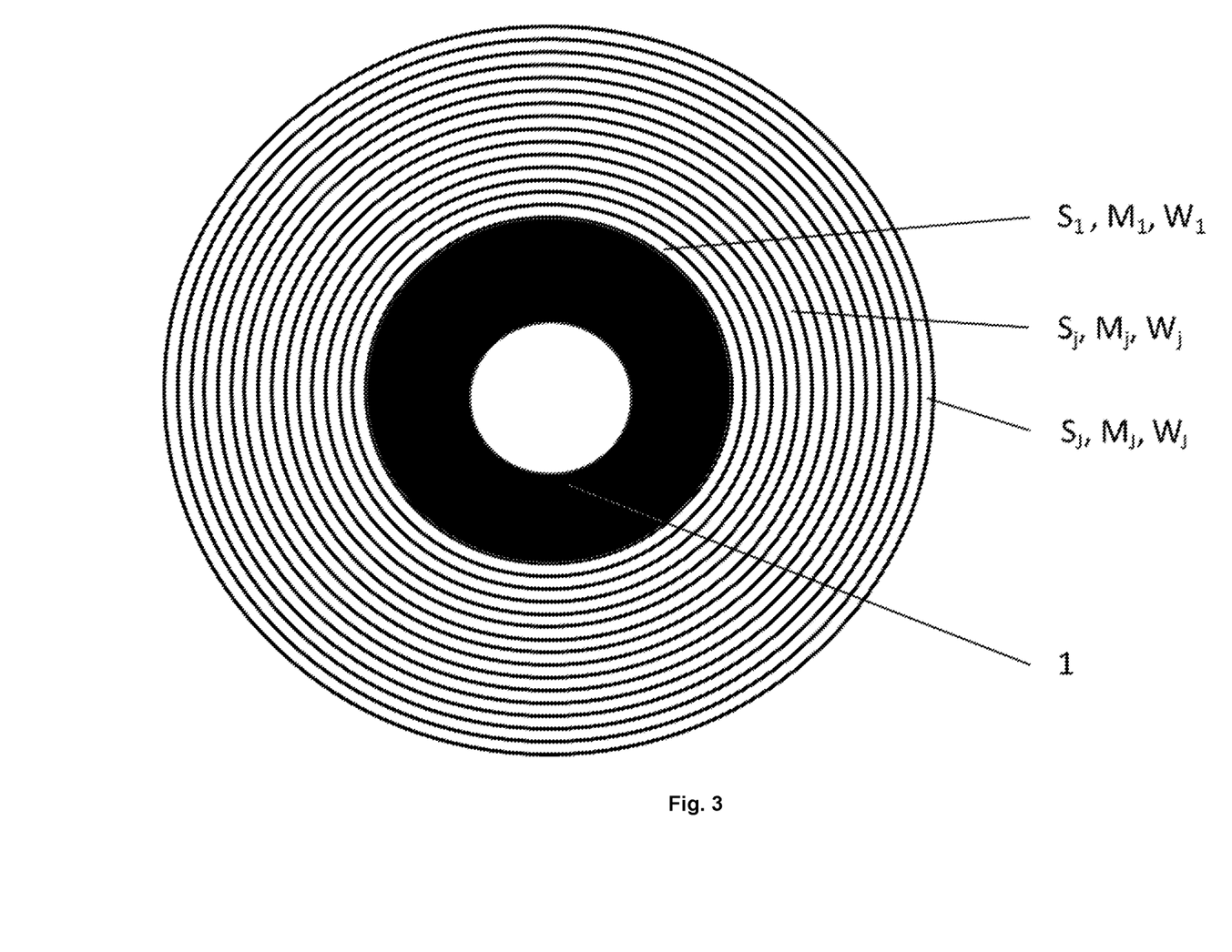
FIG. 3 is a cross sectional view taken across line AA of FIG. 1a of a spring with a tubular core and multiple layers with associated layer wall thicknesses and layer materials.
Figure 4:
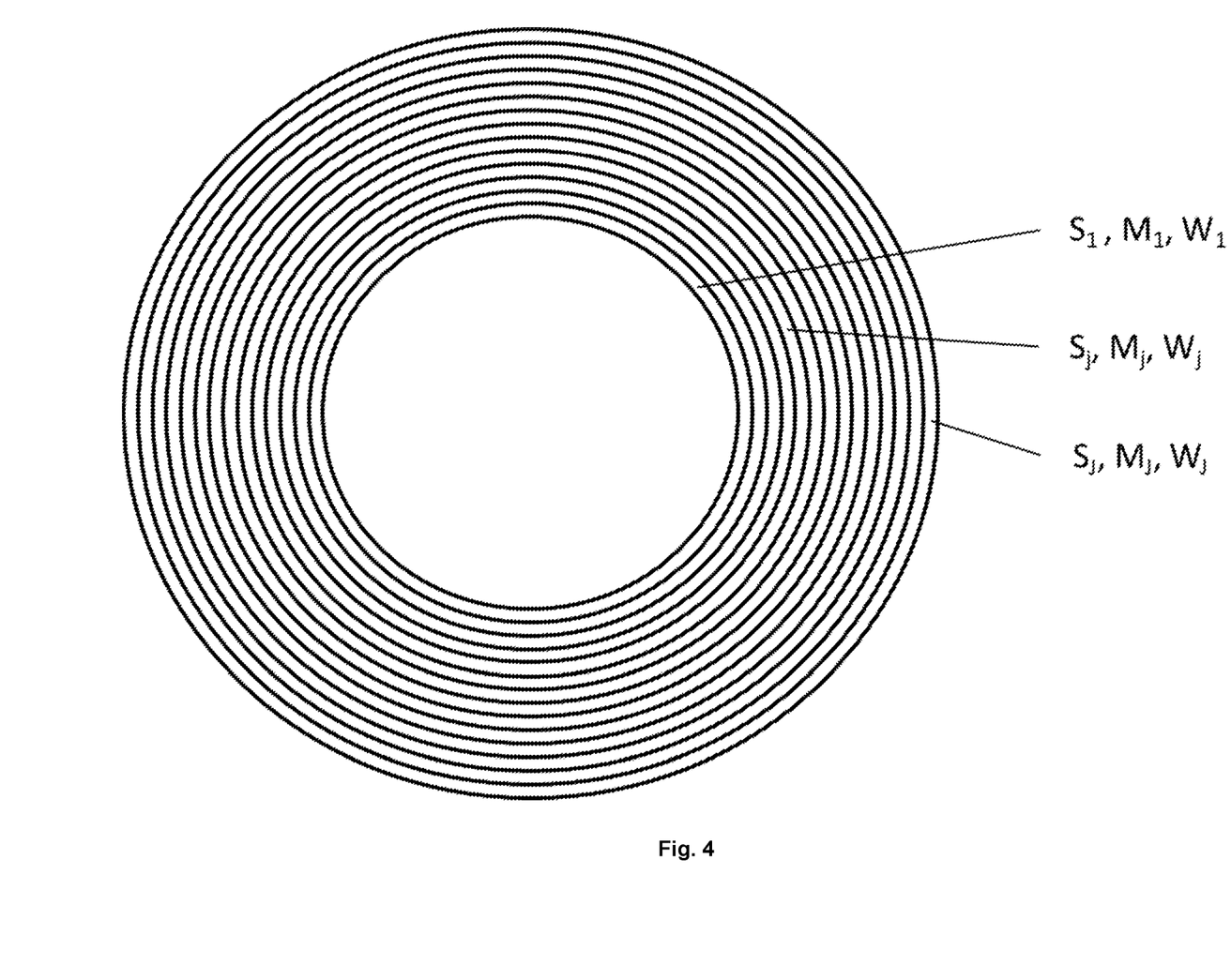
FIG. 4 is a cross sectional view taken across line B-B of a spring without a core and of multiple layers with associated layer wall thicknesses and layer materials.
Figure 5:
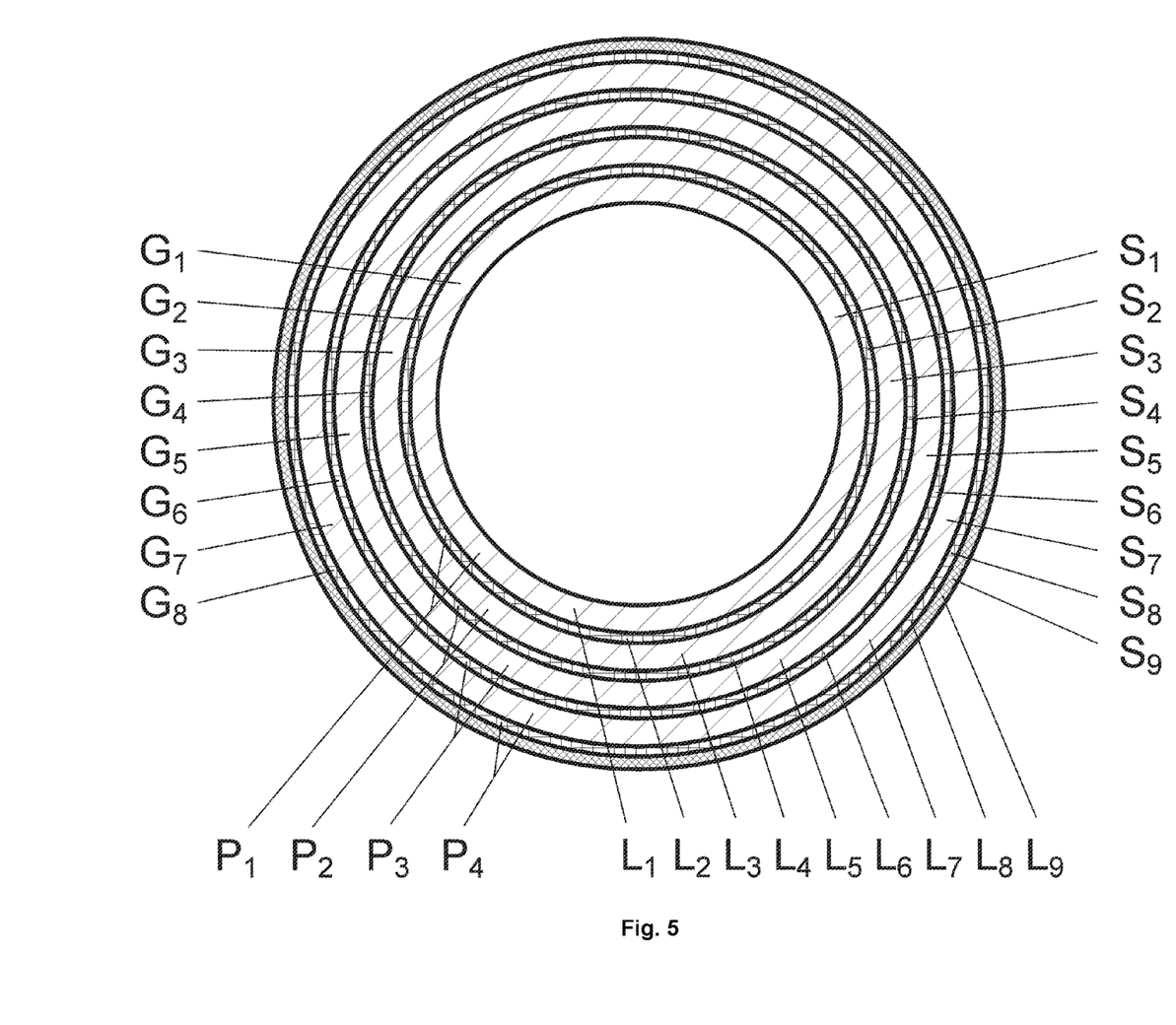
FIG. 5 is a diagrammatic view of an example arrangement of spring wire corresponding to Inventive Example 1 (see Tables 1 and 2) with a wound textile, wherein layers are arranged in alternation in a form of glassfiber ply (compression-loaded) and carbon-fiber ply (tension-loaded), with a homogeneous external plastics ply disposed on an external side of the spring.

The inventive example 1 shows a spring wire arrangement of the invention composed of wound textile plies and of a hollow core (FIG. 5). Tables 1 and 2 show the properties of the arrangement of the spring wire and the properties of the materials used. The spring wire is characterized in that it uses, always in alternation, a glassfiber ply for pressure loading and a carbon-fiber ply for tensile loading. The large difference in fiber stiffness values between glass fiber and carbon fiber requires mutual adjustment of group extensional stiffness by way of the cross-sectional area. In this example this is achieved by way of the significantly lower layer wall thickness of the carbon-fiber layer at 0.4 mm in comparison with the glassfiber layer at 1.1 mm. The ply 9 is a non-loadbearing layer because, as a homogeneous plastics ply, it does not have any preferential fiber reinforcement in tension-oriented or compression-oriented loading direction. Instead, the ply 9 represents the external termination of the spring wire in relation to the environment. Possible functions here are shielding from effects of surrounding media, protection from possible impact (for example stone impacts), protection from abrasion (for example friction-resistant protective layer in the spring plates) or prevention of contact corrosion. The proportion by mass of the non-loadbearing layers is about 7%, based on the total mass of the spring wire cross section (ignoring the mass of any spring wire core that may possibly be present).

The glassfiber layers and carbon-fiber layers in each inventive example form groups. All of the groups are successfully allocated to pairs. In accordance with the invention, all of the compression-loaded groups have lower group stiffness, and the inventive example 1 therefore provides a preferred variant of a torsion spring of the invention.

TABLE 1

| Ply $L_i$ | Layer $S_j$ | Group $G_k$ | Pair $P_n$ | Classification | Loading | Orientation [degrees] | Material $M_j$ | Ply wall thickness $LW_i$ [mm] | Layer wall thickness $W_j$ [mm] | Layer diameter $D_j$ [mm] |
|---|---|---|---|---|---|---|---|---|---|---|
| 1 | 1 | 1 | 1 | loadbearing | compression | −45 | 2 | 1.10 | 1.10 | 8.55 |
| 2 | 2 | 2 |   | loadbearing | tension | 45 | 1 | 0.40 | 0.40 | 9.30 |
| 3 | 3 | 3 | 2 | loadbearing | compression | −45 | 2 | 1.10 | 1.10 | 10.05 |
| 4 | 4 | 4 |   | loadbearing | tension | 45 | 1 | 0.40 | 0.40 | 10.80 |
| 5 | 5 | 5 | 3 | loadbearing | compression | −45 | 2 | 1.10 | 1.10 | 11.55 |
| 6 | 6 | 6 |   | loadbearing | tension | 45 | 1 | 0.40 | 0.40 | 12.30 |

TABLE 1-continued

| | | | | | | | | | |
|---|---|---|---|---|---|---|---|---|---|
| 7 | 7 | 7 | 4 | loadbearing | compression | −45 | 2 | 1.10 | 1.10 | 13.05 |
| 8 | 8 | 8 | | loadbearing | tension | 45 | 1 | 0.40 | 0.40 | 13.80 |
| 9 | 9 | | | non-loadbearing | | | 3 | 0.50 | 0.50 | 14.25 |

| Ply $L_i$ | Layer $S_j$ | Group $G_k$ | Pair $P_n$ | Cross-sectional area [mm2] | Mass [kg/m] | FR [%] | Layer stiffness [GPa] | Group stiffness [GPa] | Group extensional stiffness [kN] | Group ratio $GV_n$ |
|---|---|---|---|---|---|---|---|---|---|---|
| 1 | 1 | 1 | 1 | 14.77 | 0.03 | 0.50 | 44.70 | 44.70 | 660.37 | 1.03 |
| 2 | 2 | 2 | | 5.84 | 0.01 | 0.50 | 116.00 | 116.00 | 677.83 | |
| 3 | 3 | 3 | 2 | 17.37 | 0.03 | 0.50 | 44.70 | 44.70 | 776.22 | 1.01 |
| 4 | 4 | 4 | | 6.79 | 0.01 | 0.50 | 116.00 | 116.00 | 787.16 | |
| 5 | 5 | 5 | 3 | 19.96 | 0.04 | 0.50 | 44.70 | 44.70 | 892.08 | 1.00 |
| 6 | 6 | 6 | | 7.73 | 0.01 | 0.50 | 116.00 | 116.00 | 896.48 | |
| 7 | 7 | 7 | 4 | 22.55 | 0.04 | 0.50 | 44.70 | 44.70 | 1007.93 | 1.00 |
| 8 | 8 | 8 | | 8.67 | 0.01 | 0.50 | 116.00 | 116.00 | 1005.81 | |
| 9 | 9 | | | 11.19 | 0.01 | only plastic | non-loadbearing | non-loadbearing | non-loadbearing | non-loadbearing |

TABLE 2

| Material no. | Stiffness Type | Density class | Example configuration - 50% FEC | | | | |
|---|---|---|---|---|---|---|---|
| | | [kg/m³] | E1 [GPa] | E2 [GPa] | nu12 | nu21 | G12 [GPa] |
| 1 | CF | HT | 1500 | 116 | 5.4 | 0.28 | 0.01 | 2.3 |
| 2 | GF | S2 | 1870 | 44.7 | 6.4 | 0.29 | 0.04 | 2.4 |
| 3 | Plastic | PA6 | 1140 | 2.8 | 2.8 | 0.3 | 0.3 | 1.1 |

Figure 6:
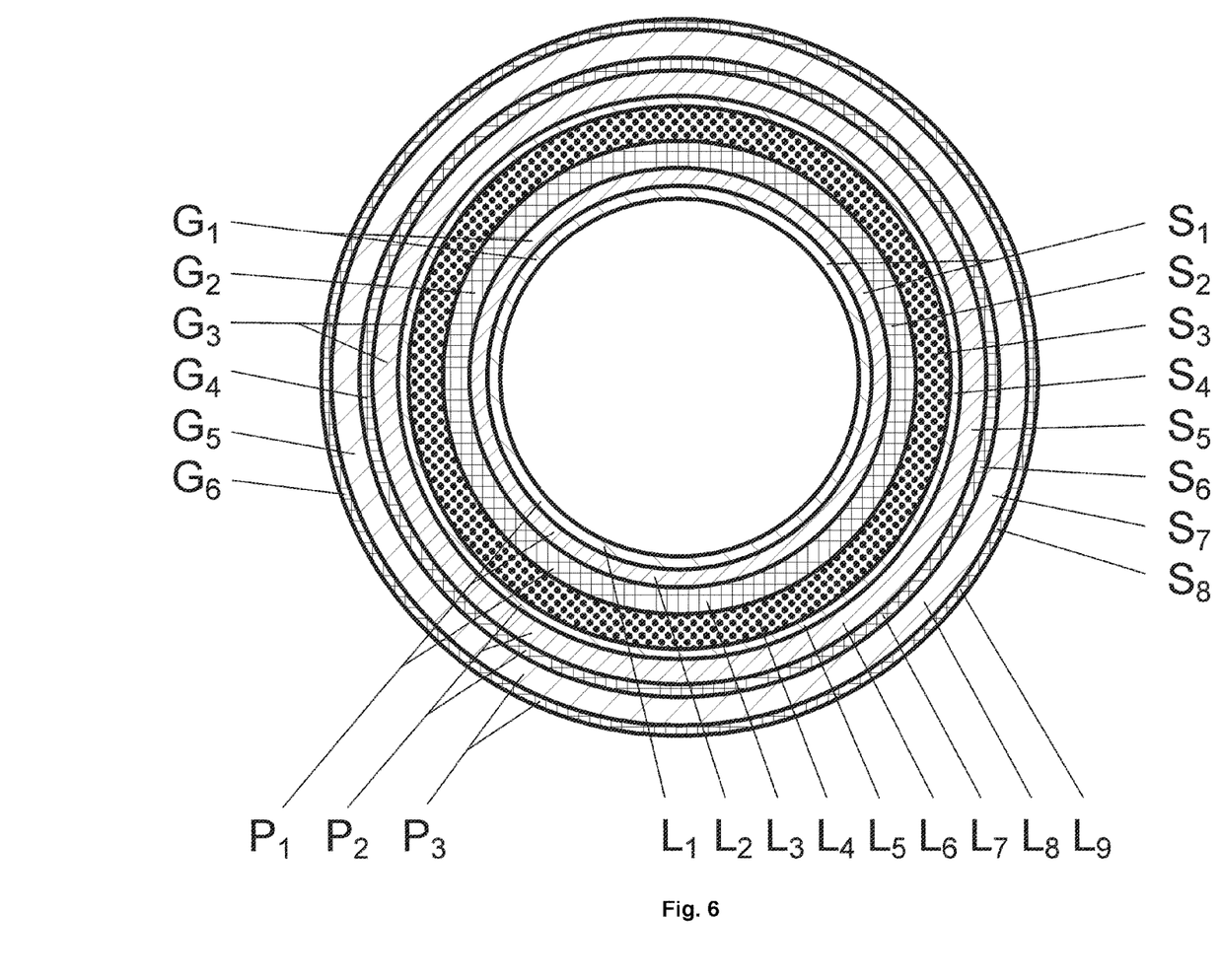
FIG. 6 is a diagrammatic view of an example arrangement of spring wire corresponding to Inventive Example 2 (see Tables 3 and 4) with a wound textile, wherein compression-loaded layers take a form of basalt-fiber ply and tension-loaded layers take a form of carbon-fiber ply, with the spring having fibers oriented along a longitudinal axis in a fourth ply.

The inventive example 2 shows a spring wire arrangement of the invention composed of wound textile plies and of a hollow core (FIG. 6). Tables 3 and 4 show the properties of the arrangement of the spring wire and the properties of the materials used. By virtue of the technical possibility of applying identical fiber material and identical fiber angle in relation to the longitudinal axis, the plies 1 and 2 form only one layer ($S_1$). Application of fiber with identical fiber angles and fiber material in a plurality of plies can prove to be advantageous when by way of example in the case of a coiling process the individual rovings are intended to form a uniform applied structure, and the intention is to prevent displacement of the individual rovings toward one another and/or partial overlapping of the individual rovings. The layer $S_1$ provides the group $G_1$. Carbon fibers were used for this compression-loaded group, located well toward the inside of the spring wire, because tensile strength values arising here are relatively low, and the loadbearing capacity of the material is therefore not exceeded. The ply 4 in the inventive example 2 is composed of a carbon-fiber ply with a fiber angle of 0°. This is a layer with a fiber angle outside of the range from 20° to 70° or of the range from −20° to −70°, said layer therefore being classified as non-loadbearing. This type of layer has an advantageous effect on robustness in relation to transverse loading of the spring wire wound helically around the spring axis, and is therefore useful up to a certain proportion by mass. In this case the proportion by mass of non-loadbearing layers is about 16%, and therefore less than 25% based on the total mass of the spring wire. The compression-loaded plies ($L_5$, $L_6$, $L_8$) situated further outward are composed of basalt-fiber plies. In accordance with the invention, the basalt-fiber plies have lower group stiffness than the tension-loaded ply with the highest group stiffness (e.g. $L_9$). The group stiffness of $L_5$ here is lower by 58%, and that of the plies $L_6$ and $L_8$ is lower by 62%. The proportion by mass of the compression-loaded fiber plies that have lower group stiffness is 82%, because only the masses of the plies $L_1$ and $L_2$ fail to comply with this criterion. At the same time, the group stiffness of the tension-loaded ply $L_9$ is 139 GPa, this therefore being significantly above the required 60 GPa. All of the tension-loaded plies here are composed of carbon fibers. The inventive example 2 is a preferred variant of the torsion spring of the invention. All of the groups are successfully allocated to pairs.

TABLE 3

| Ply $L_i$ | Layer $S_j$ | Group $G_k$ | Pair $P_n$ | Classification | Loading | Orientation [degrees] | Material $M_j$ | Ply wall thickness $LW_i$ [mm] | Layer wall thickness $W_j$ [mm] | Layer diameter $D_j$ [mm] |
|---|---|---|---|---|---|---|---|---|---|---|
| 1 | 1 | 1 | 1 | loadbearing | compression | −45 | 1 | 0.5 | 0.5 | 7.25 |
| 2 | | | | loadbearing | compression | −45 | 1 | 0.7 | 0.7 | 7.85 |
| 3 | 2 | 2 | | loadbearing | tension | 45 | 1 | 1.05 | 1.05 | 8.725 |
| 4 | 3 | | | non-loadbearing | | 0 | 1 | 1.35 | 1.35 | 9.925 |
| 5 | 4 | 3 | 2 | loadbearing | compression | −45 | 2 | 0.4 | 0.4 | 10.8 |
| 6 | 5 | | | loadbearing | compression | −40 | 2 | 1 | 1 | 11.5 |
| 7 | 6 | 4 | | loadbearing | tension | 45 | 1 | 0.5 | 0.5 | 12.25 |
| 8 | 7 | 5 | 3 | loadbearing | compression | −40 | 2 | 1.1 | 1.1 | 13.05 |
| 9 | 8 | 6 | | loadbearing | tension | 45 | 1 | 0.4 | 0.4 | 13.8 |

| Ply $L_i$ | Layer $S_j$ | Group $G_k$ | Pair $P_n$ | Cross-sectional area [mm2] | Mass [kg/m] | FVG [%] | Layer stiffness [GPa] | Group stiffness [GPa] | Group extensional stiffness [kN] | Group ratio $GV_n$ |
|---|---|---|---|---|---|---|---|---|---|---|
| 1 | 1 | 1 | 1 | 5.69 | 0.009 | 60% | 139.00 | 139.00 | 1991.27 | 1.00 |
| 2 | | | | 8.63 | 0.013 | 60% | 139.00 | | | |

TABLE 3-continued

| | | | | | | | | | | |
|---|---|---|---|---|---|---|---|---|---|---|
| 3 | 2 | 2 | | 14.39 | 0.022 | 60% | 139.00 | 139.00 | 2000.27 | |
| 4 | 3 | | | 21.05 | 0.033 | 60% | non-loadbearing | non-loadbearing | non-loadbearing | non-loadbearing |
| 5 | 4 | 3 | 2 | 6.79 | 0.014 | 60% | 58.00 | 53.96 | 1340.96 | 1.00 |
| 6 | 5 | | | 18.06 | 0.038 | 60% | 52.45 | | | |
| 7 | 6 | 4 | | 9.62 | 0.015 | 60% | 139.00 | 139.00 | 1337.34 | |
| 8 | 7 | 5 | 3 | 22.55 | 0.047 | 60% | 52.45 | 52.45 | 1182.58 | 1.02 |
| 9 | 8 | 6 | | 8.67 | 0.013 | 60% | 139.00 | 139.00 | 1205.24 | |

TABLE 4

| Material no. | Stiffness Type | Stiffness class | Example configuration - 60% FVG | | | | | |
|---|---|---|---|---|---|---|---|---|
| | | | Density | E1 [GPa] | E2 [GPa] | nu12 | nu21 | G12 [GPa] |
| 1 | CF | HT | 1550 | 139 | 6.3 | 0.26 | 0.01 | 3.8 |
| 2 | BF | | 2100 | 58 | 8 | 0.28 | 0.04 | 3.5 |

Key $L_i$ Ply i (numeric index i within the finite range of the natural numbers [1,I])
$LW_i$ Wall thickness of the ply i
$S_j$ Layer j (numeric index j within the finite range of the natural numbers [1,J])
$\alpha_j$ Angular orientation in relation to the longitudinal axis of the layer $S_j$
1 Spring wire core (optionally present)
$M_j$ Material of the layer $S_j$
$D_j$ Diameter of the layer $S_j$
$W_j$ Wall thickness of the layer $S_j$
$E_{S_j}$ Stiffness of the layer $S_j$
$E_1$ Stiffness longitudinally in relation to the fiber of the material $M_j$
$E_2$ Stiffness perpendicularly to the fiber direction of the material $M_j$
$G_{12}$ Shear modulus of the material $M_j$
$v_{12}$ Major Poisson's ratio of the material $M_j$
$v_{21}$ Minor Poisson's ratio of the material $M_j$
$G_k$ Group k (numeric index k within the finite range of the natural numbers [1,K])
$A_{S_j}$ Cross-sectional area of the layer $S_j$
$E_{G_k}$ Group stiffness of the group $G_k$
$F_{G_k}$ Group extensional stiffness of the group $G_k$
$P_n$ Pair n (numeric index n within the finite range of the natural numbers [1,N])
$GV_n$ Group ratio n, calculated from a tension- and compression-loaded group
$D_a$ External diameter of spring wire
CF Carbon fiber
GF Glass fiber
BF Basalt fiber
S2 Higher-stiffness glass fiber
E Normal-stiffness glass fiber
HT Normal-stiffness (high-tenacity) carbon fiber

What is claimed is:

1. A torsion spring comprised of a spring wire made of fiber-composite material and including a plurality of layers of fiber reinforcement that have been saturated with a matrix material, wherein each of the plurality of layers includes only fibers that are tension-loaded or only fibers that are compression-loaded, wherein the plurality of layers comprise tension-loaded groups of layers and compression-loaded groups of layers, wherein at least one compression-loaded group of layers has a lower group stiffness than a tension-loaded group of layers with a highest group stiffness.

2. The torsion spring of claim 1 wherein said lower group stiffness is at least 10% lower than said highest group stiffness of the tension-loaded group of layers.

3. The torsion spring of claim 1 wherein at least one internally-situated compression-loaded group of layers has a lower group stiffness than a tension-loaded group of layers that is situated further outward than the at least one internally-situated compression-loaded group of layers.

4. The torsion spring of claim 1 wherein said highest group stiffness of the tension-loaded group of layers is at least 60 GPa.

5. The torsion spring of claim 1 wherein the tension-loaded group of layers with the highest group stiffness is composed exclusively of carbon fibers.

6. The torsion spring of claim 1 wherein the tension-loaded groups of layers are comprised of at least 50% by mass carbon fibers.

7. The torsion spring of claim 1 wherein a proportion by mass of at least 50% of the tension-loaded groups of layers has a group stiffness differing by less than 50% from said highest group stiffness of the tension-loaded group of layers.

8. The torsion spring of claim 1 wherein all of the tension-loaded groups of layers have a group stiffness differing by less than 50% from said highest group stiffness of the tension-loaded group of layers.

9. The torsion spring of claim 1 wherein a proportion by mass of at least 20% of the compression-loaded groups of layers has a lower group stiffness than said highest group stiffness of the tension-loaded group of layers.

10. The torsion spring of claim 1 wherein a proportion by mass of at least 50% of the compression-loaded groups of layers has a group stiffness differing by less than 50% from that of a compression-loaded group of layers with a highest group stiffness classified as low.

11. The torsion spring of claim 1 wherein all of the compression-loaded groups of layers have a group stiffness differing by less than 50% from that of a compression-loaded group of layers with a highest group stiffness classified as low.

12. The torsion spring of claim 1 wherein the compression-loaded groups of layers are comprised of a proportion by mass of at least 30% glass fibers or basalt fibers.

13. The torsion spring of claim 1 wherein at most 6 different fiber compositions are used for the tension-loaded and compression-loaded groups of layers.

14. The torsion spring of claim 1 wherein at least one pair formed from the tension-loaded group and the compression-loaded group has a group ratio in a range from 0.2 to 5.0.

15. The torsion spring of claim 1 wherein based on the spring wire and ignoring a mass of a core, a proportion by mass of the groups of layers that have formed pairs is at least 50%.

16. The torsion spring of claim 1 wherein for the layers that have a mixture of fiber compositions, a quantity of each fiber composition present in each mixed-fiber layer is at least 10% by mass.

17. The torsion spring of claim 1 wherein a proportion by mass of layers classified as non-loadbearing in the spring wire, ignoring a mass of a core, is at most 25%.

18. The torsion spring of claim 1 wherein a cross section of the spring wire is circular, elliptical, or polygonal.

19. The torsion spring of claim 1 wherein a matrix of fiber-reinforced plastics plies is comprised of a filled or unfilled thermoset plastic.

20. The torsion spring of claim 1 wherein the spring wire has a core that is hollow, that is comprised of fiber-reinforced material with unidirectional fibers in an axial direction of the spring wire, or that is comprised of material without fiber reinforcement.

21. The torsion spring of claim 1, wherein the torsion spring is a helical spring.

22. The torsion spring of claim 1, wherein the torsion spring is a torsion bar.

23. A method of making a torsion spring made of a multiple-ply fiber-composite material, the method comprising:
  pre-designing the spring;
  forming groups of fibers made of layers in contact with one another and having an identical loading direction;
  determining computationally a group stiffness for each group of fibers;
  adjusting the group stiffnesses of compression-loaded groups such that the compression-loaded groups have a lower group stiffness than a tension-loaded group with a highest group stiffness;
  forming pairs from an inside towards an outside so that each pair comprises a tension-loaded group and a compression-loaded group that are radially adjacent;
  determining a group ratio as a quotient calculated as a relationship between the group extensional stiffness values of the tension-loaded group and the compression-loaded group of each pair;
  minimizing shear stresses between adjacent groups via variation of the stiffness ratios by at least one of varying a layer wall thickness, varying a type of material, or varying a fiber angle until the group ratio is in a range from 0.2 to 5; and
  repeating all steps except for pre-designing the spring until a desired loadbearing capability has been achieved with a given spring stiffness profile.

24. The method of claim 23 wherein the adjusting is achieved in that at least one of a fiber material is changed, mixtures of various fiber materials are changed, or a fiber angle is altered.

* * * * *